June 14, 1927.  1,632,557
C. L. MOON
TROLLEY SWITCH
Filed Jan. 18, 1926   2 Sheets-Sheet 1
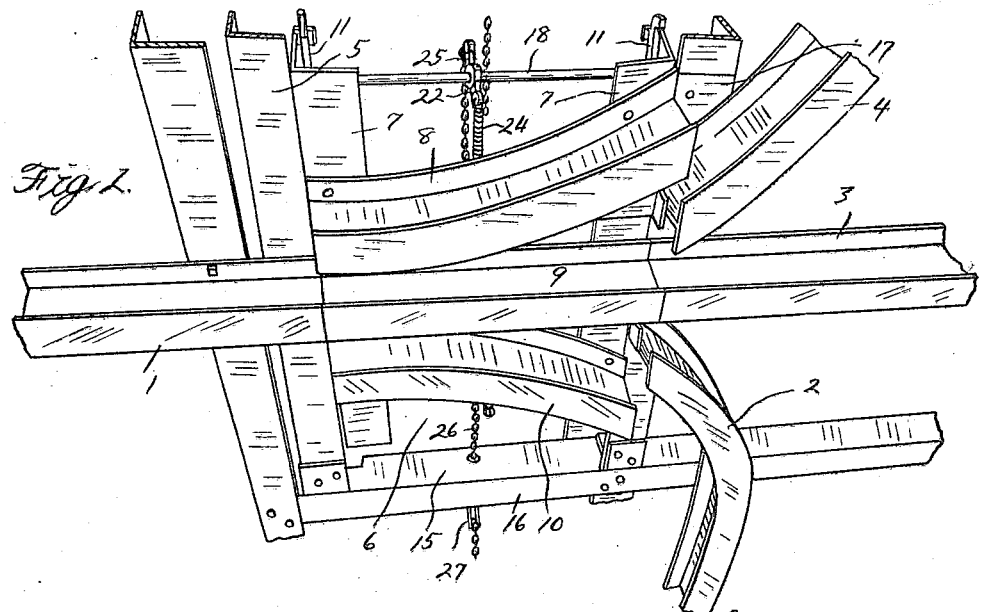
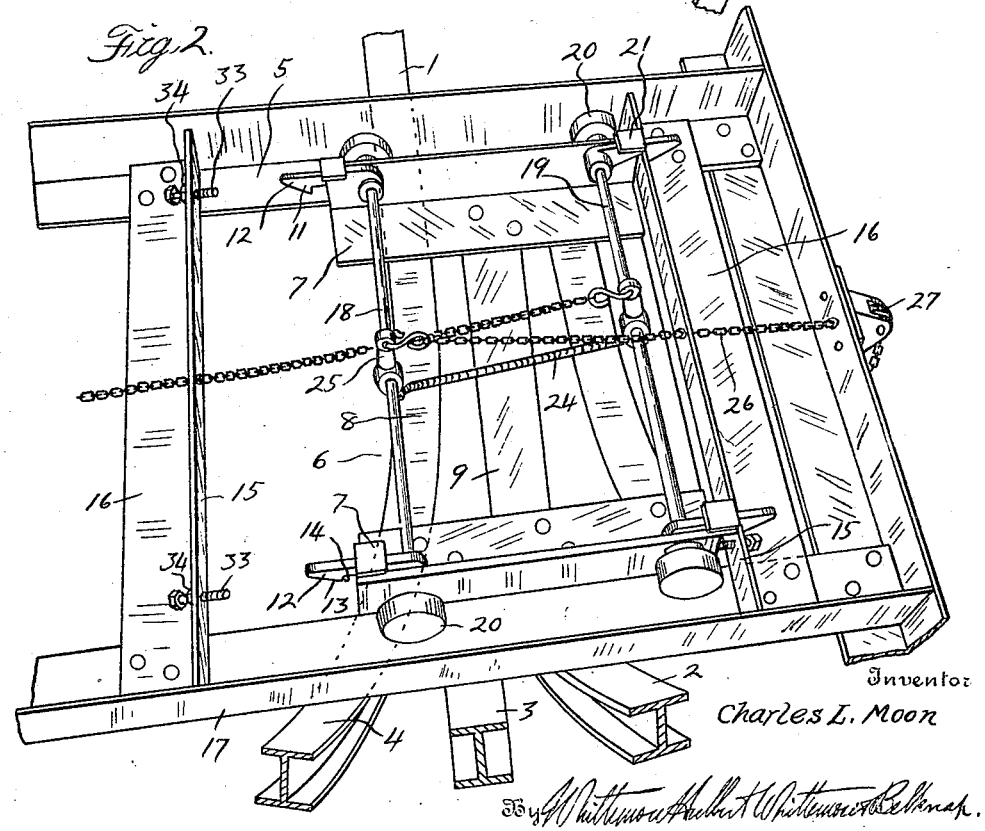
Inventor
Charles L. Moon June 14, 1927.  1,632,557
C. L. MOON
TROLLEY SWITCH
Filed Jan. 18, 1926   2 Sheets-Sheet 2

Inventor
Charles L. Moon

Patented June 14, 1927.

1,632,557

UNITED STATES PATENT OFFICE.

CHARLES L. MOON, OF DETROIT, MICHIGAN, ASSIGNOR TO THE CECIL R. LAMBERT COMPANY, OF DETROIT, MICHIGAN, A CORPORATION OF MICHIGAN.

TROLLEY SWITCH.

Application filed January 18, 1926. Serial No. 82,142.

The invention relates to trolley switches and is particularly applicable to overhead trolley systems. One of the objects of the invention is to provide a control switch so constructed that the ends of the movable track sections forming the switch may be accurately registered with the ends of the stationary track sections to avoid jarring the trolley during its travel. Another object is to provide means operable from a remote point for securing the switch in its adjusted positions and for also moving the switch to different positions of adjustment. A further object of the invention is to provide a carriage for the movable track sections and latch members upon this carriage for alternatively securing the carriage in various positions of adjustment, the latch members being normally held in position by a common means to engage stationary cooperating members. With these as well as other objects in view the invention resides in the novel features of construction and combinations and arrangements of parts as more fully hereinafter set forth.

In the drawings:—

Figures 1 and 2 are perspective views of a trolley system having applied thereto a switch embodying my invention;

Figure 3:
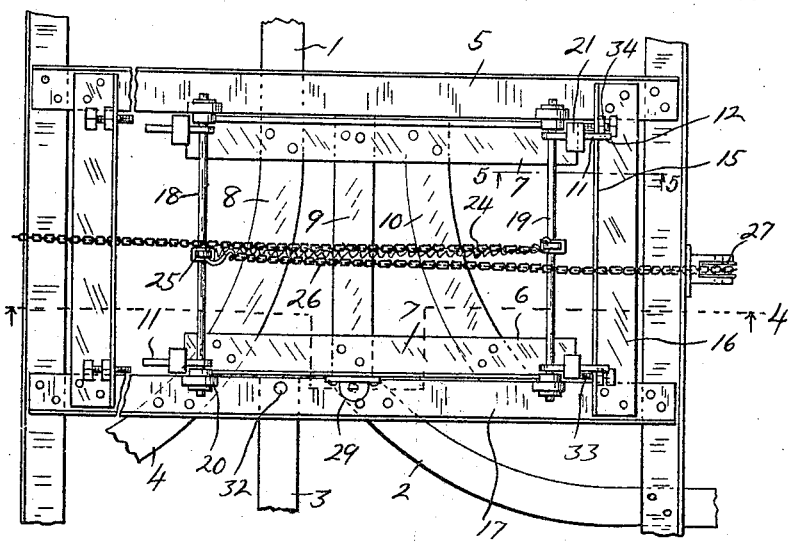
Figure 3 is a plan view, particularly showing the switch.
Figure 4:
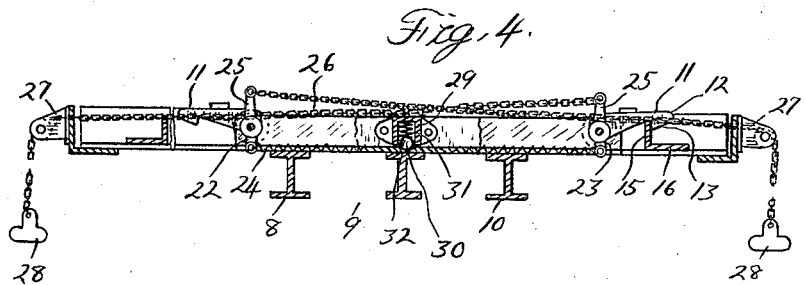
Figure 4 is a sectional side elevation thereof.
Figure 5:
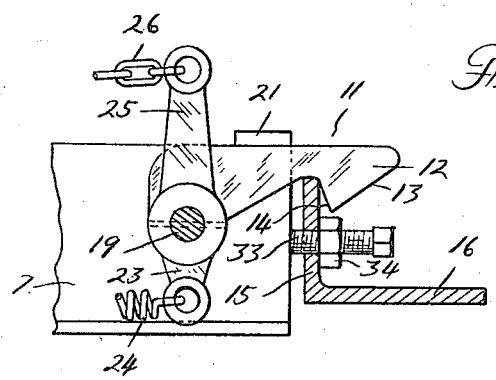
Figure 5 is a section taken on the line 5—5 of Figure 3.

1 is a stationary track section and 2, 3 and 4 are other stationary track sections longitudinally spaced from the track section 1, all of these track sections being rigidly secured to and suspended from the overhead frame 5 and being adapted to support a trolley. The switch for alternatively connecting the track section 1 with the track sections 2, 3 and 4 is supported upon the frame 5 and is movable transversely of the track section 1.

In detail, this switch includes the carriage 6 having the angle shaped side bars 7 and the movable track sections 8, 9 and 10 which are rigidly secured to and suspended from the lower flanges of the side bars and function to form with the side bars the carriage frame. The movable track sections 8, 9 and 10 are shaped so that their ends may register respectively with the ends of the stationary track sections 2, 3 and 4 and with the end of the stationary track section 1. The carriage 6 is movable transversely of the stationary track section and may be secured in a position to register with either of the movable track sections 8, 9 and 10 with their respective stationary track sections.

For securing the carriage in its various positions of adjustment I have provided at each end and at the inner side of the upright flanges of the side bars 7 the latches 11 which have the hooked free ends 12 with beveled noses providing the lower inclined faces 13 and the shoulders 14 which are adapted to respectively slide over and lock against the upright flanges 15 of the angle shaped bars 16. These bars extend between and are secured to the angle shaped bars 17 which form part of the frame 5 and to which the stationary track sections are rigidly secured. The latches 11 are preferably fixedly secured upon the shafts 18 and 19 which extend through and are journaled in the upright flanges of the carriage side bars 7, wheels 20 being journaled upon the ends of these shafts and resting upon the lower flanges of the bars 17, which constitute tracks for the carriage. For limiting the downward movement of the latches so that the inclined faces of their noses will properly engage the upright flanges of the bars 16 and slide thereover, I have provided the lateral flanges 21 upon the upper edges of the latches and preferably integral therewith for engaging the upper edges of the upright flanges of the side bars 7. These flanges preferably extend in opposite directions to permit using the latches at either side of the carriage. For normally holding the latches in their downward positions and with their lateral flanges engaging the upright flanges of the carriage side bars there are secured to the shafts 18 and 19 the vertically extending arms 22 and 23 respectively, which extend downwardly below the shafts and have their ends secured to opposite ends of the coil spring 24.

To release the latches upon the shaft 18 from the upright flange of the adjacent bar 16 and to move the carriage away from this bar, I have provided the extension 25 upon the arm 22 and extending upwardly above the shaft 18 and secured to the end of this extension is the chain 26, which extends longitudinally of the carriage and away from the bar with which these latches engage through the bar 16 at the opposite end and over the pulley 27 mounted upon the frame, the chain then extending downwardly and being provided with a handle 28 within reach of the operator, the arrangement being such that upon pulling the handle downwardly the latches upon the shaft 18 are disengaged from the upright flange of the bar 16 and the carriage then moved longitudinally upon the bars 17. A similar arrangement is provided to release the latches upon the shaft 19 from the upright flange of the adjacent bar 16 when these latches are in locking engagement with the bar and also to move the carriage in the opposite direction, the arm 23 upon the shaft 19 having an extension above the shaft with its free end connected to the end of a chain which extends longitudinally of the carriage through the upright flange of the first-mentioned bar 16 and then over a pulley and downwardly with its lower end connected to a handle.

The latches upon the shaft 18 secure the carriage in position to register the ends of the movable track section 8 with the ends of its respective stationary track sections and the latches upon the shaft 19 are adapted to secure the carriage in position to register the ends of the movable track section 10 with the ends of its respective stationary track sections. To secure the carriage in position to register the ends of the intermediate movable track section 9 with the ends of its respective stationary track sections, I have mounted upon the upright flange of one of the side bars 7 of the carriage the housing 29, in which is slidably mounted the plunger 30, which is forced downwardly by means of the coil spring 31, the lower end of this plunger being engageable with the lower flange of the bar 17 and adapted to engage in the recess 32 of this lower flange to properly position the carriage to bring the ends of the intermediate movable track section into registration with the ends of its respective stationary track sections.

In order to limit the movements of the carriage, I have provided upon the upright flanges of the bars 16 the set screws 33 which threadedly engage these upright flanges and are positioned to engage the ends of the upright flanges of the side bars 7 of the carriage, these set screws being adjustable and being locked in position by means of the lock nuts 34.

With the above arrangement, the ends of the movable track sections may be accurately registered with the ends of their respective stationary track sections to prevent jarring the trolley during its travel. Also the construction is such that the frame in addition to supporting the stationary track sections also functions as a track for the carriage forming part of the switch and further provides elements cooperating with the latches for retaining the carriage in its various positions of adjustment. Furthermore, the arrangement is such that the means for securing the carriage in its various positions of adjustment may be readily released and the carriage moved to another position.

What I claim as my invention is:

1. The combination with a stationary track section and a movable track section having one end registerable with an end of said stationary track section, of a carriage movable transversely of said stationary track section and supporting said movable track section, a shaft upon said carriage, means for supporting said carriage, including wheels journaled upon said shaft, a latch upon said shaft for securing said carriage in position to register the ends of said track sections, and means for releasing said latch.

2. The combination with a stationary track section and a plurality of movable track sections, each having one end registerable with an end of said stationary track section, of a carriage movable transversely of said stationary track section and supporting said movable track sections, means for securing said carriage in positions to alternatively register the ends of said movable track sections and said stationary track section, said means including movable latch members upon said carriage near its opposite ends and stationary members alternatively engageable with said latch members, and a common means tending to normally retain said movable latch members in position to engage said stationary members.

3. The combination with a frame and a stationary track section suspended therefrom, of a carriage movable transversely of said stationary track section, movable track sections suspended from said carriage having one end registerable with an end of said stationary track section, transverse shafts upon said carriage, wheels journaled upon said shaft and supported upon said frame, swinging latches upon said shafts engageable with said frame to secure said carriage in position to alternatively register the ends of said movable track sections with the end of said stationary track section and common means tending to retain said latches in position to engage said frame.

4. The combination with a stationary track section and a series of movable track sections each having one end registerable with an end of said stationary track section, of a carriage movable transversely of said stationary track section and supporting said movable track sections, a frame constituting a support for said stationary track section and a track for said carriage, and means for securing said carriage in position to alternatively register the ends of said movable track sections with the end of said stationary track section, including a spring pressed plunger and swinging members engageable with said frame in various positions of adjustment of said carriage to retain the same in adjusted position.

5. The combination with a stationary track section and a movable track section having one end registerable with an end of said stationary track section, of a carriage movable transversely of said stationary track section and supporting said movable track section, rock shafts journaled in said carriage at the opposite ends thereof, latch members rigidly secured to said rock shafts and stationary members alternatively engageable with said latch members, and means for rocking said shafts to disengage the latch members from the stationary members.

6. The combination with a stationary track section and a plurality of movable track sections, each having one end registerable with an end of said stationary track section, of a carriage movable transversely of said stationary track section and supporting said movable track sections, means for securing said carriage in positions to alternately register the ends of said movable track sections and said stationary track section, said means including latch members carried by said carriage and stationary frame members alternately engageable with said latch members, and adjustable members secured to the stationary frame members for limiting the movements of said carriage.

In testimony whereof I affix my signature.

CHARLES L. MOON.